(12) United States Patent
Tu et al.

(10) Patent No.: US 7,471,324 B2
(45) Date of Patent: Dec. 30, 2008

(54) AMPLIFIER SHARED BETWEEN TWO COLUMNS IN CMOS SENSOR

(75) Inventors: Nick Tu, La Crescenta, CA (US); Alexander Krymski, La Crescenta, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 683 days.

(21) Appl. No.: 10/229,176

(22) Filed: Aug. 28, 2002

(65) Prior Publication Data

US 2004/0041931 A1 Mar. 4, 2004

(51) Int. Cl.
H04N 5/335 (2006.01)

(52) U.S. Cl. .................. 348/300; 348/302; 348/303; 348/308; 348/332; 250/208.1

(58) Field of Classification Search .......... 348/294, 348/300, 301, 302, 303, 308, 332; 250/208.1
See application file for complete search history.

(56) References Cited

U.S. PATENT DOCUMENTS

| | | | | |
|---|---|---|---|---|
| 4,809,075 | A * | 2/1989 | Akimoto et al. ............ 348/301 |
| 5,721,422 | A * | 2/1998 | Bird ........................ 250/208.1 |
| 5,900,767 | A * | 5/1999 | Bird et al. .................. 327/407 |
| 6,031,570 | A * | 2/2000 | Yang et al. ................. 348/300 |
| 6,133,862 | A * | 10/2000 | Dhuse et al. ............... 341/118 |
| 6,140,630 | A | 10/2000 | Rhodes |
| 6,222,175 | B1 | 4/2001 | Krymski |
| 6,351,283 | B1 * | 2/2002 | Liu ........................... 348/301 |
| 6,421,085 | B1 * | 7/2002 | Xu ............................ 348/308 |
| 6,476,864 | B1 * | 11/2002 | Borg et al. .................. 348/245 |
| 6,646,249 | B2 * | 11/2003 | Bird ........................ 250/208.1 |
| 6,710,803 | B1 * | 3/2004 | Kang ......................... 348/245 |
| 6,822,211 | B2 * | 11/2004 | Hagihara .................. 250/208.1 |
| 6,831,690 | B1 * | 12/2004 | John et al. .................. 348/302 |
| 6,885,396 | B1 * | 4/2005 | Panicacci et al. ............ 348/241 |
| 6,914,627 | B1 * | 7/2005 | Dong ........................ 348/248 |
| 6,919,551 | B2 * | 7/2005 | Barna et al. ............. 250/214 R |
| 6,953,923 | B2 * | 10/2005 | Yang et al. ............... 250/208.1 |
| 6,956,606 | B2 * | 10/2005 | Mabuchi .................... 348/308 |

(Continued)

OTHER PUBLICATIONS

Iliana L. Fujimori, et al., "A 256×256 CMOS Differential Passive Pixel imager with FPN Reduction Techniques"; 2000 IEEE International Solid State Circuits Conference, Feb. 7, 2000, pp. 106-107.

*Primary Examiner*—Lin Ye
*Assistant Examiner*—Chriss S Yoder, III
(74) *Attorney, Agent, or Firm*—Dickstein Shapiro LLP

(57) ABSTRACT

The present invention provides an improved shared amplifier circuitry and method of operation which minimizes offset and column to column fixed pattern noise during a read out operation. The circuit improves the consistency of the pixel to pixel output of the pixel array and increases the dynamic range of the pixel output and saves chip area. This is accomplished by simultaneously sampling and storing charge accumulated signals from a first and a second desired pixel from a respective first and second column. The circuit amplifies the first charge signal and then samples and amplifies the reset signal of the first desired pixel and subsequently outputs the amplified first charge signal and the reset signal. Then the circuit amplifies the second charge signal and the reset signal of the first desired pixel and subsequently outputs the amplified second charge signal and the reset signal.

65 Claims, 11 Drawing Sheets

U.S. PATENT DOCUMENTS

2002/0100862 A1* 8/2002 Liu .......................... 250/208.1
2003/0025816 A1* 2/2003 Sakuragi .................... 348/301
2003/0223003 A1* 12/2003 Meynants ................... 348/294
2006/0023095 A1* 2/2006 Rossi ........................ 348/301

* cited by examiner

3T PIXEL (PRIOR ART)

US 7,471,324 B2

AMPLIFIER SHARED BETWEEN TWO COLUMNS IN CMOS SENSOR

FIELD OF THE INVENTION

The invention relates generally to improved semiconductor imaging devices and in particular to an imaging device which can be fabricated using a standard CMOS process. Particularly, the invention relates to a CMOS active pixel sensor (APS) imager having an array of pixel cells and to the column circuitry for reading the cells.

BACKGROUND OF THE INVENTION

There is a current interest in CMOS active pixel imagers for use as low cost imaging devices. An exemplary pixel circuit of a CMOS active pixel sensor (APS) is described below with reference to FIG. 1. Active pixel sensors can have one or more active transistors within the pixel unit cell, can be made compatible with CMOS technologies, and promise higher readout rates compared to passive pixel sensors. The FIG. 1 circuit 100 exemplary pixel cell 150 is a 3T APS, where the 3T is commonly used in the art to designate use of three transistors to operate the pixel. A 3T pixel has a photodiode 162, a reset transistor 184, a source follower transistor 186, and a row select transistor 188. It should be understood that while FIG. 1 shows the circuitry for operation of a single pixel, and that in practical use there will be an M times N array of identical pixels arranged in rows and columns with the pixels of the array accessed using row and column select circuitry, as described in more detail below.

The photodiode 162 converts incident photons to electrons which collect at node A. A source follower transistor 186 has its gate connected to node A and thus amplifies the signal appearing at Node A. When a particular row containing cell 150 is selected by a row selection transistor 188, the signal amplified by transistor 186 is passed on a column line 170 to the readout circuitry. The photodiode 162 accumulates a photo-generated charge in a doped region of the substrate. It should be understood that the CMOS imager might include a photogate or other photoconversion device, in lieu of a photodiode, for producing photo-generated charge.

A reset voltage source Vrst is selectively coupled through reset transistor 184 to node A. The gate of reset transistor 184 is coupled to a reset control line 191 which serves to control the reset operation in which Vrst is connected to node A. Vrst may be Vdd. The row select control line 160 is coupled to all of the pixels of the same row of the array. Voltage source Vdd is coupled to a source following transistor 186 and its output is selectively coupled to a column line 170 through row select transistor 188. Although not shown in FIG. 1, column line 170 is coupled to all of the pixels of the same column of the array and typically has a current sink at its lower end. The gate of row select transistor 188 is coupled to row select control line 160.

As know in the art, a value is read from pixel 150 in a two step process. During a charge integration period the photodiode 162 converts photons to electrons which collect at the node A. The charges at node A are amplified by source follower transistor 186 and selectively passed to column line 170 by row access transistor 188. During a reset period, node A is reset by turning on reset transistor 184 and the reset voltage is applied to node A and read out to column line 170 by the source follower transistor 186 through the activated row select transistor 188. As a result, the two different values—the reset voltage Vrst and the image signal voltage Vsig—are readout from the pixel and sent by the column line 170 to the readout circuitry where each is sampled and held for further processing as known in the art.

All pixels in a row are read out simultaneously onto respective column lines 170 and the column lines are activated in sequence for reset and signal voltage read out. The rows of pixels are also read out in sequence onto the respective column lines.

FIG. 2 shows a CMOS active pixel sensor integrated circuit chip that includes an array of pixels 230 and a controller 232 which provides timing and control signals to enable reading out of signals stored in the pixels in a manner commonly known to those skilled in the art. Exemplary arrays have dimensions of M times N pixels, with the size of the array 230 depending on a particular application. The imager is read out a row at a time using a column parallel readout architecture. The controller 232 selects a particular row of pixels in the array 230 by controlling the operation of row addressing circuit 234 and row drivers 240. Charge signals stored in the selected row of pixels are provided on the column lines 170 (FIG. 1) to a readout circuit 242 in the manner described above. The pixel signal read from each of the columns then can be read out sequentially using a column addressing circuit 244. Differential pixel signals (Vrst, Vsig) corresponding to the read out reset signal and integrated charge signal are provided as respective outputs Vout1, Vout2 of the readout circuit 242.

FIG. 3 more clearly shows the rows and columns 349 of pixels 350. Each column includes multiple rows of pixels 350. Signals from the pixels 350 in a particular column can be read out to a readout circuit 351 associated with that column. The read out circuit 351 includes sample and hold circuitry for acquiring the pixel reset (Vrst) and integrated charge signals (Vsig). Signals stored in the readout circuits 351 then can be read sequentially column-by-column to an output stage 354 which is common to the entire array of pixels 330. The analog output signals can then be sent, for example, to a differential analog circuit and which subtracts the reset and integrated charge signals and sends them to an analog-to-digital converter (ADC), or the reset and integrated charge signals are each supplied to the analog-to-digital converter.

FIG. 4 more clearly shows the column readout circuit 351 that includes a sample and hold read out circuit 401 and an amplifier 434. The FIG. 4 circuit is capable of sampling and holding and then amplifying the Vsig and Vrst values for subsequent use by an output stage 354 (FIG. 3).

For example, a Vsig from a desired pixel ("Vsig1") coupled to column line 402 is stored on C1 capacitor 418 and a Vrst from the desired pixel ("Vrst1") is stored on capacitor 420. Then the Vsig1 stored on C1 capacitor 418 is transferred and amplified by amplifier 434 to capacitor 462. Then Vrst1 is transferred and amplified by amplifier 434 to capacitor 460, at which point the Vrst and Vsig signals for the desired pixel are readout to an output stage 354. (FIG. 3).

As seen in FIG. 4, a first column line 402 is switchably coupled through SH1 switch 410 to the front side of C1 capacitor 418. The backside of C1 capacitor 418 is coupled to ground. The front side of C1 capacitor 418 is also switchably coupled through SH3 switch 414 through a buffer 430 to the front side of capacitor 438. The backside of capacitor 438 is coupled to a first input line to an amplifier 434. Vref is coupled to the second input line to amplifier 434. The first input line to the amplifier 434 is switchably coupled through Amp Rst switch 436 to the output of amplifier 434. The first input line to the amplifier 434 is also coupled through Amp Rst switch 436 to the output of amplifier 434. The output of amplifier 434 is switchably coupled through SHR1 switch 472 to a frontside of capacitor 460. The backside of capacitor 460 is coupled to ground. The frontside of capacitor 460 is switchably coupled through SHR2 switch 476 to a first input to output stage 354. The output of amplifier 434 is also switchably coupled through SHS1 switch 474 to a frontside of capacitor 462. The backside of capacitor 462 is coupled to ground. The frontside of capacitor 462 is switchably coupled through SHR2 switch 478 to a second input to output stage 354.

The operation of the FIG. 4 circuit is now described with reference to the simplified signal timing diagram of FIG. 5 (assuming a readout from a 3T pixel). To store Vsig1 on C1 capacitor 418 while the pixel is in the signal sampling phase, a pulse signal SH1 is applied which temporarily closes the SH1 switch 410 and couples the desired pixel with the front side of capacitor 418 through the column line 402. Thus, Vsig1 is stored on C1 capacitor 418. After the desired pixel is pulsed by a pixel reset signal, the pixel is in reset signal sampling phase. To store Vrst1 on capacitor 420 pulse signal SH2 is applied which temporarily closes the SH2 switch 412 and couples the desired pixel with the front side of capacitor 420 through the column line 402. Thus, Vrst1 is stored on C2 capacitor 420.

To transfer Vsig1 through the amplifier 434, pulse signals Amp Rst, SH3, and SHS1 are applied which temporarily closes SH3, Amp Rst, and SHS1 switches 414, 436, and 474 and forces the signal stored on the front side of capacitor 418 and carried on line 402 through amplifier 434 after going through a buffer 430 and a capacitor 438. The signal output from amplifier 434 is stored on capacitor 462. Thus, the amplified Vsig1 signal is stored on capacitor 462.

To transfer Vrst1 through the amplifier 434, pulse signals SH4 and SHR1 are applied which temporarily closes SH4 and SHR1 switches 416 and 472 and forces the signal stored on the front side of capacitor 420 and carried on line 402 through amplifier 434 after going through a buffer 430 and a capacitor 438. The signal output from amplifier 434 is stored on capacitor 460. Thus, the amplified Vrst1 signal is stored on capacitor 460. Vsig1 and Vrst1 signals are transferred to output stage 354 by applying pulses SHR2, SHS2 enabling and closing respective SHR2, SHS2 switches 476, 478.

In pixels arrays, where real estate is precious it would be desirable to shared the column readout circuitry among a plurality of column lines.

BRIEF SUMMARY OF THE INVENTION

The present invention provides an shared amplifier circuitry and method of operation. The circuit eliminates circuitry and improves the consistency of the pixel to pixel output of the pixel array and reducing readout noise, thereby increasing the dynamic range of the pixel output. This is accomplished by sampling and storing both charge signals from a first and a second desired pixel. Then the circuit samples and stores both reset signals from the first and the second desired pixels. The circuit then amplifies the charge and reset signals from the first desired pixel and transfers both signals to a downstream circuit. Subsequently, the circuit then amplifies the charge and reset signals from the second desired pixel and transfers both signals to a downstream circuit.

In an additional embodiment, a shared amplifier circuitry is accomplished by sampling and storing both charge signals from the first and the second desired pixels. The circuit transfers and amplifies the charge signal from the first desired pixel to a second storage area. The circuit then samples and stores the reset signal of the first desired pixel and subsequently transfers and amplifies the reset signal to a third storage area. The amplified charge and reset signals of the first desired pixel are readout. Subsequently the circuit transfers and amplifies the charge signal from the second desired pixel to the second storage area and transfers and amplifies the reset signal of the first desired pixel to a third storage area. The amplified charge signal of the second desired pixel and the amplified reset signal of the first desired pixel can then be readout. Respective buffer circuits are provided for each of the column lines to reduce column to column fixed pattern noise.

These and other features and advantages of the invention will be more readily understood from the following detailed description of the invention which is provided in connection with the accompanying drawings.

DETAILED DESCRIPTION OF THE INVENTION

In the following detailed description, reference is made to the accompanying drawings, which form a part hereof, and in which is shown by way of illustration specific embodiments in which the invention may be practiced. These embodiments are described in sufficient detail to enable those of ordinary skill in the art to make and use the invention, and it is to be understood that structural, logical or other changes may be made to the specific embodiments disclosed without departing from the spirit and scope of the present invention.

To minimize die space, signal level loss, and column to column noise, the present invention utilizes a shared column amplifier circuit using two pixels from two columns, a first desired pixel from a first column and a second desired pixel from a second column as the sources of input to a shared amplifier.

Figure 1:
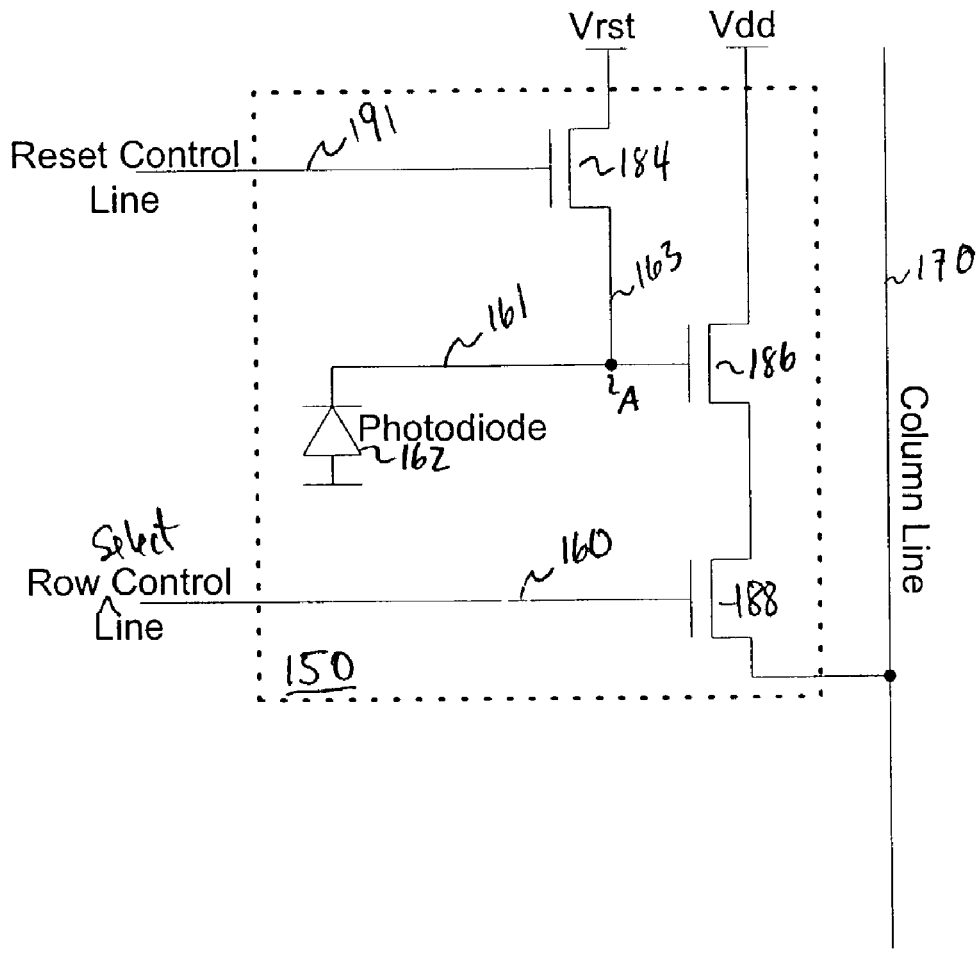
FIG. 1 is a prior art active pixel.
Figure 2:
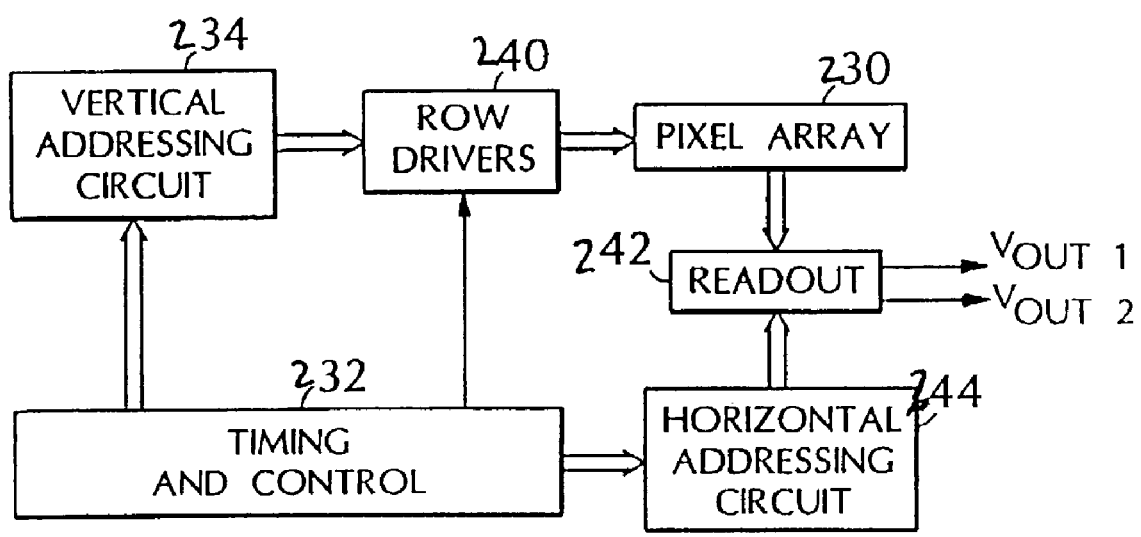
FIG. 2 is a block diagram of a prior art CMOS active sensor chip.
Figure 3:
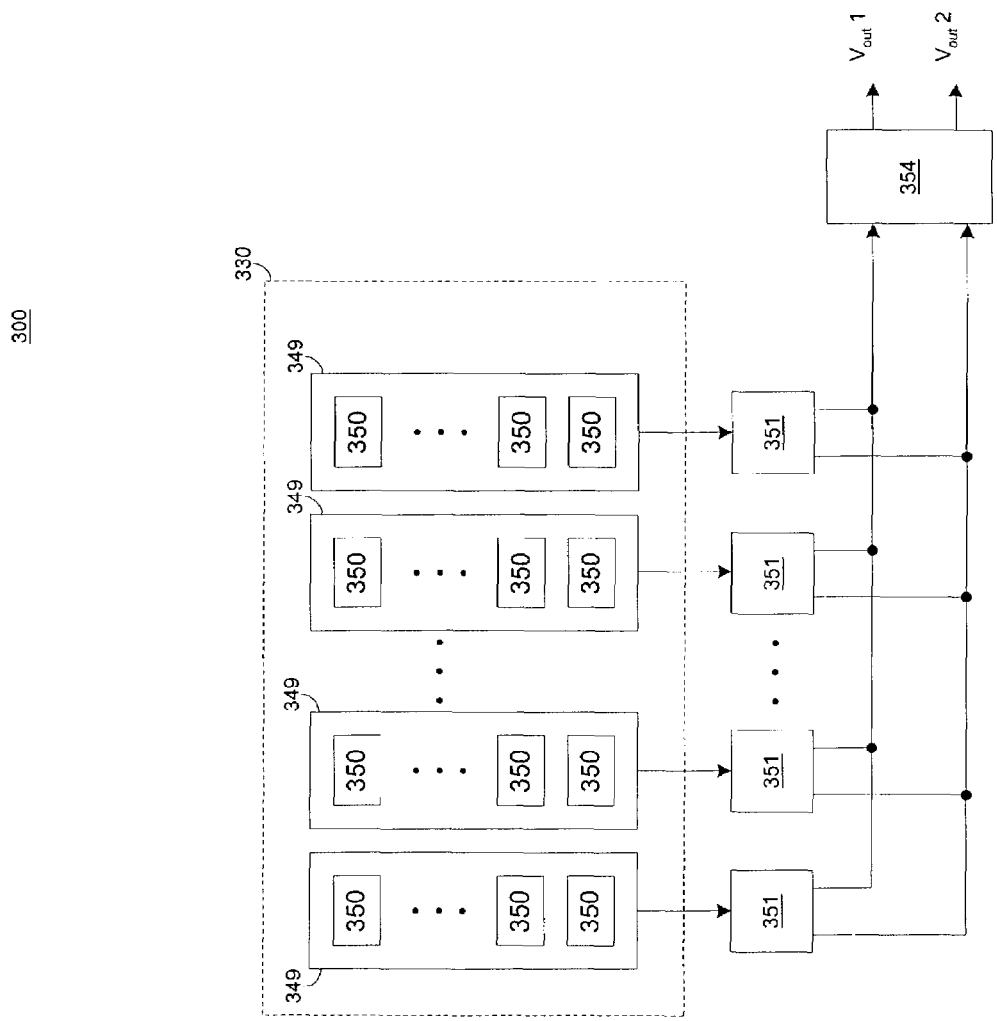
FIG. 3 is a block diagram of a prior art array of active pixels and an associated readout circuit.
Figure 4:
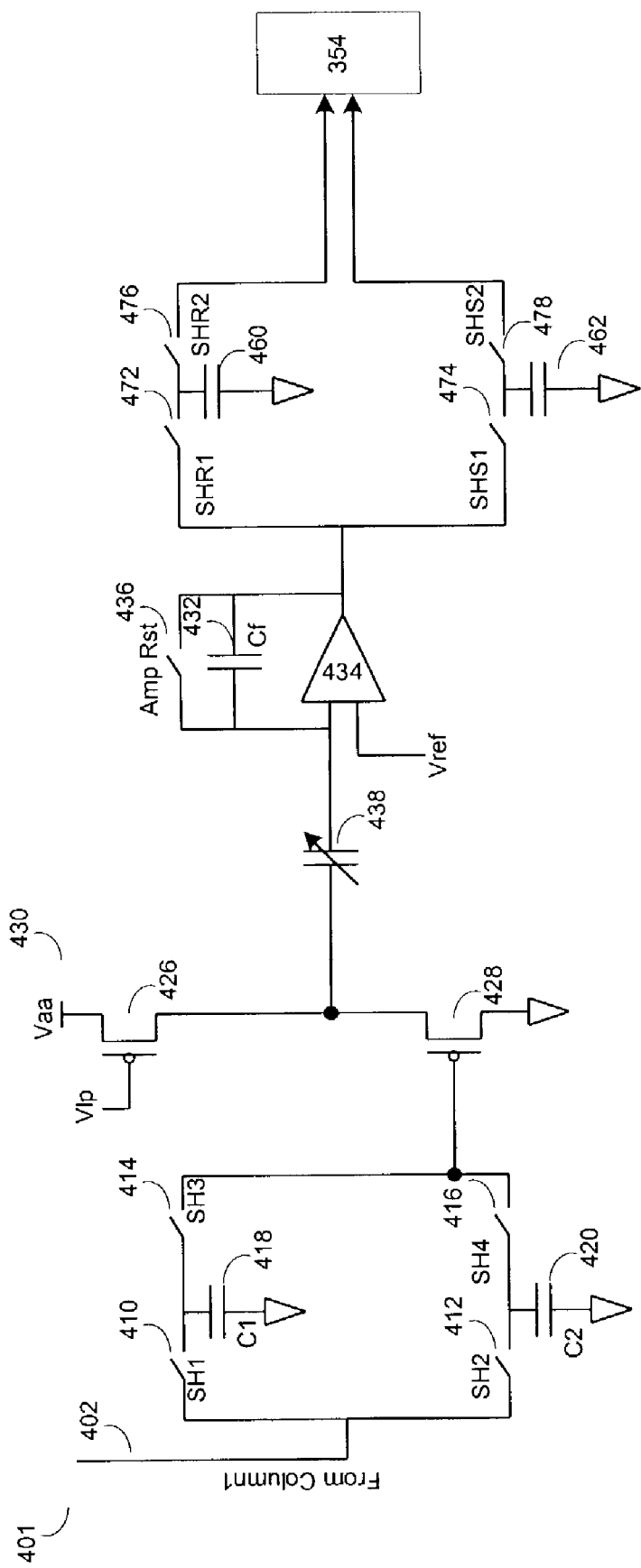
FIG. 4 is a prior art column readout circuit.
Figure 5:
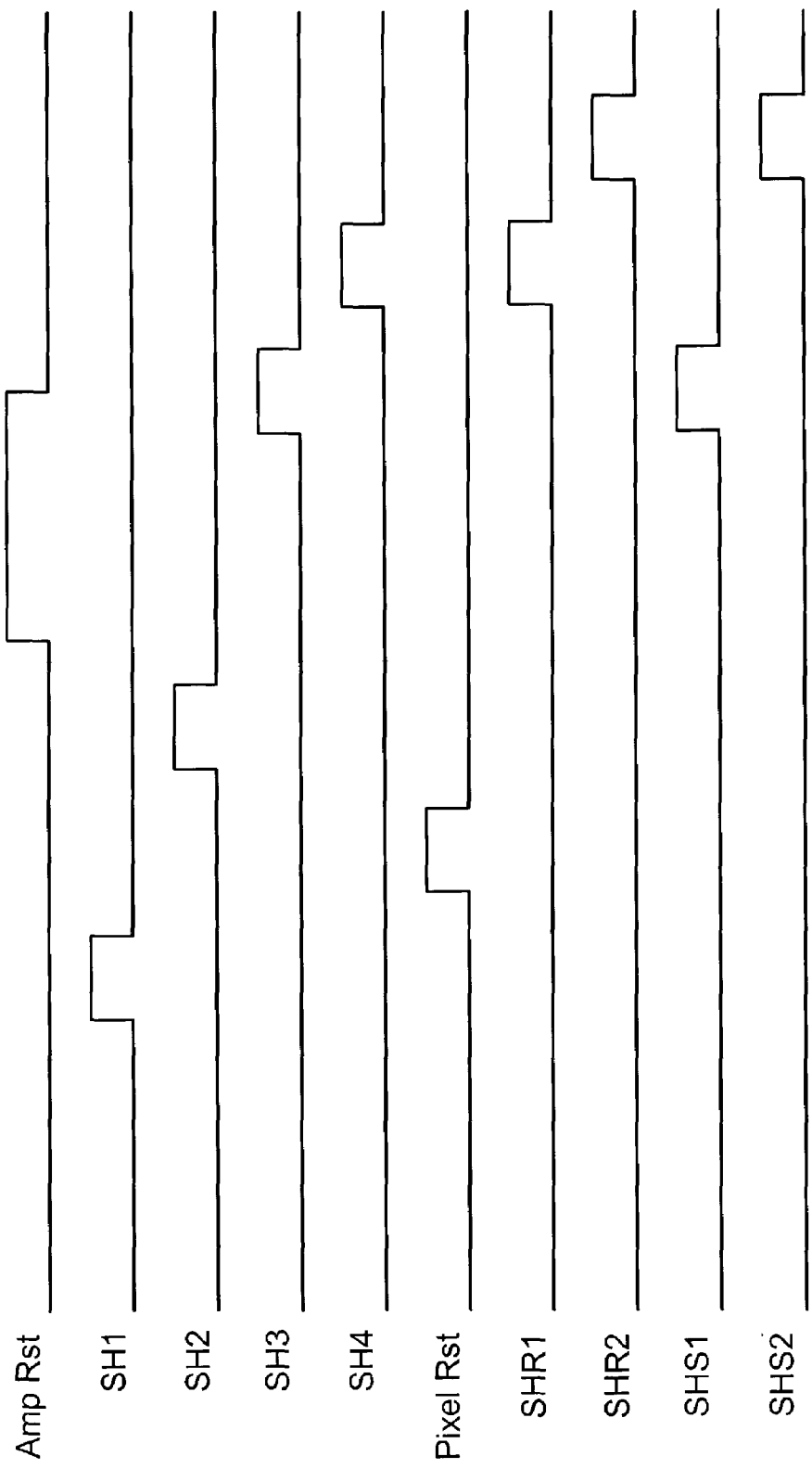
FIG. 5 is a simplified timing diagram associated with the circuitry of FIG. 4.
Figure 6:
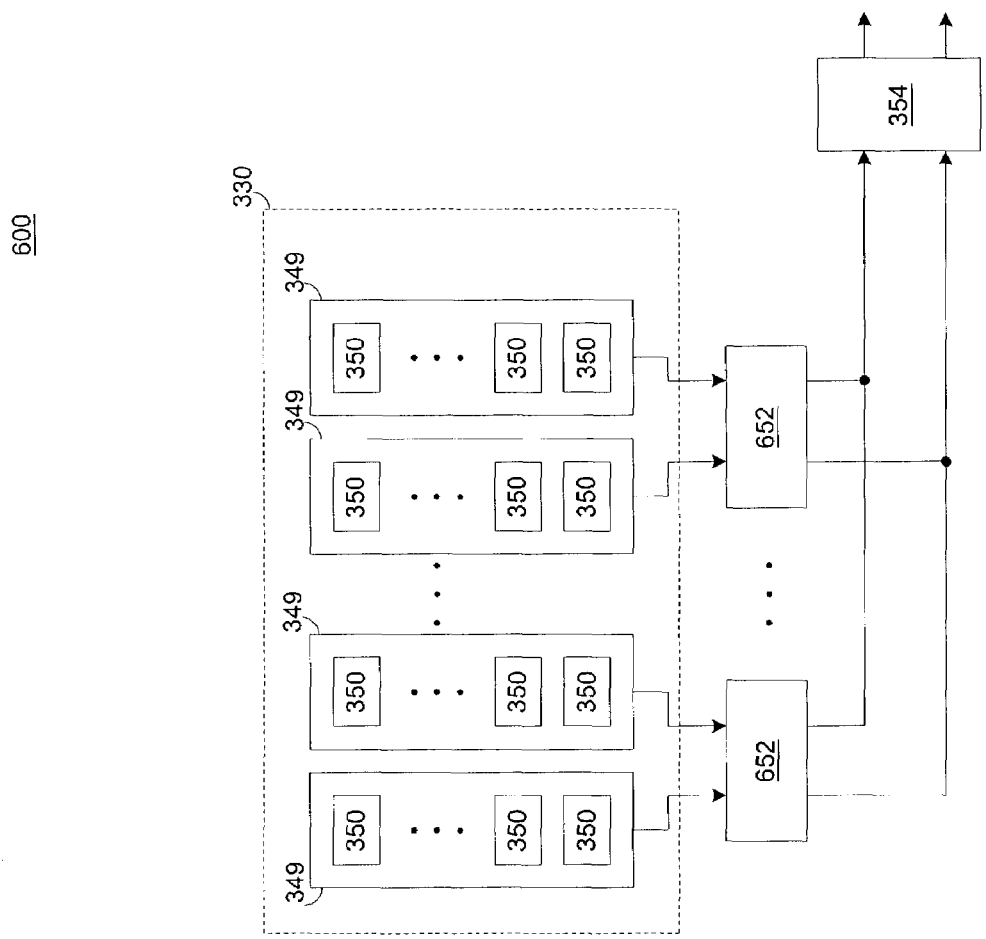
FIG. 6 is a block diagram of an array of active pixels and an associated readout circuit.

A first embodiment of the invention in which a readout circuit is shared between two column lines is shown and described with reference to FIGS. 6-8. As shown in FIG. 6, each readout circuit 652 is shared by two columns 349 of pixels 350. The read out circuit 652 includes sample and hold circuitry for acquiring the pixel reset (Vrst) and integrated charge signals (Vsig). Signals stored in the readout circuits 652 then can be read sequentially column-by-column to an output stage 354 which is common to the entire array of pixels 330. The analog output signals can then be sent, for example, to a differential analog circuit and which subtracts the reset and integrated charge signals and sends them to an analogto-digital converter (ADC), or the reset and integrated charge signals are each supplied to the analog-to-digital converter.

Figure 7:
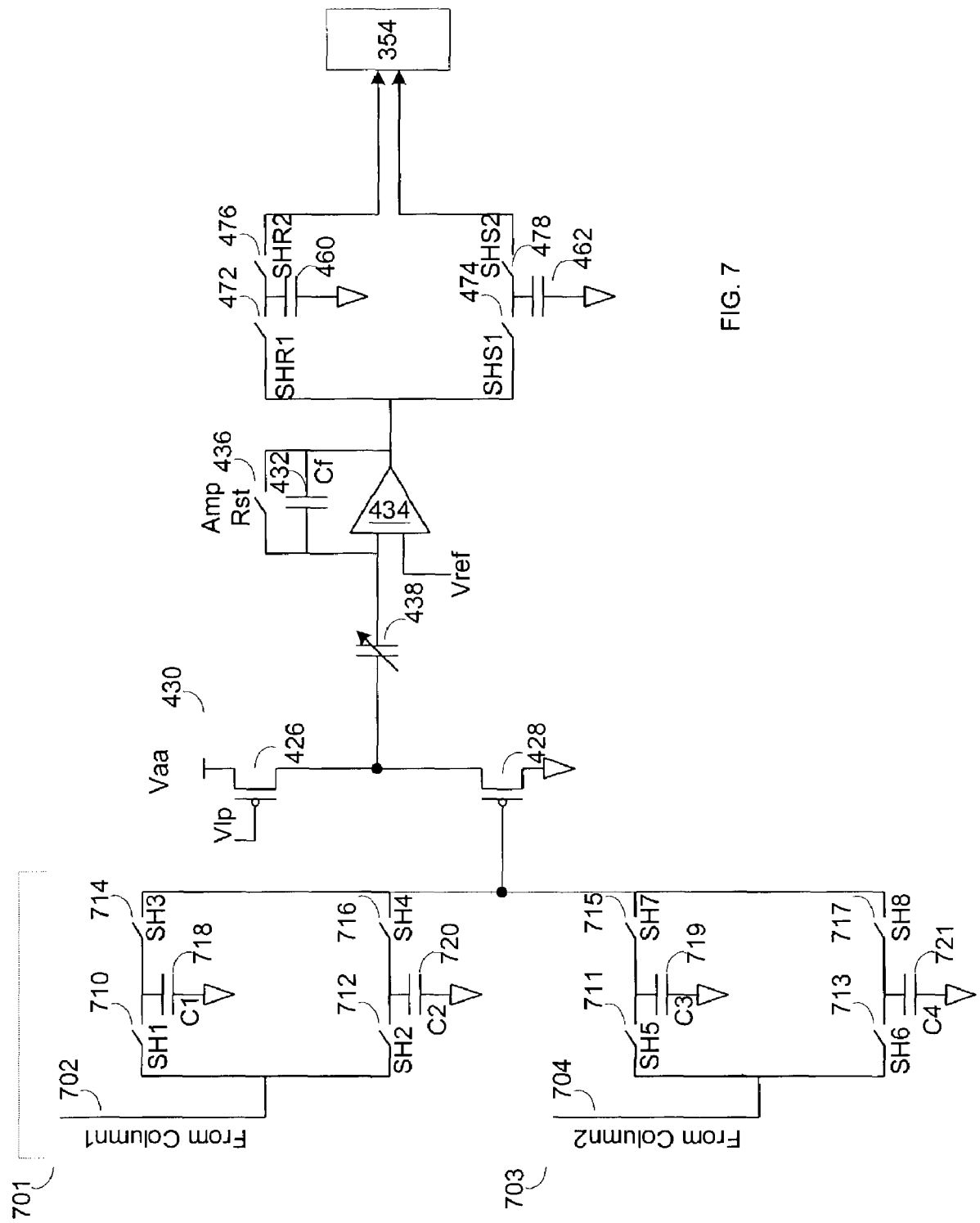
FIG. 7 is a two column shared amplifier readout circuitry in accordance with an exemplary embodiment of the invention.
Figure 8:
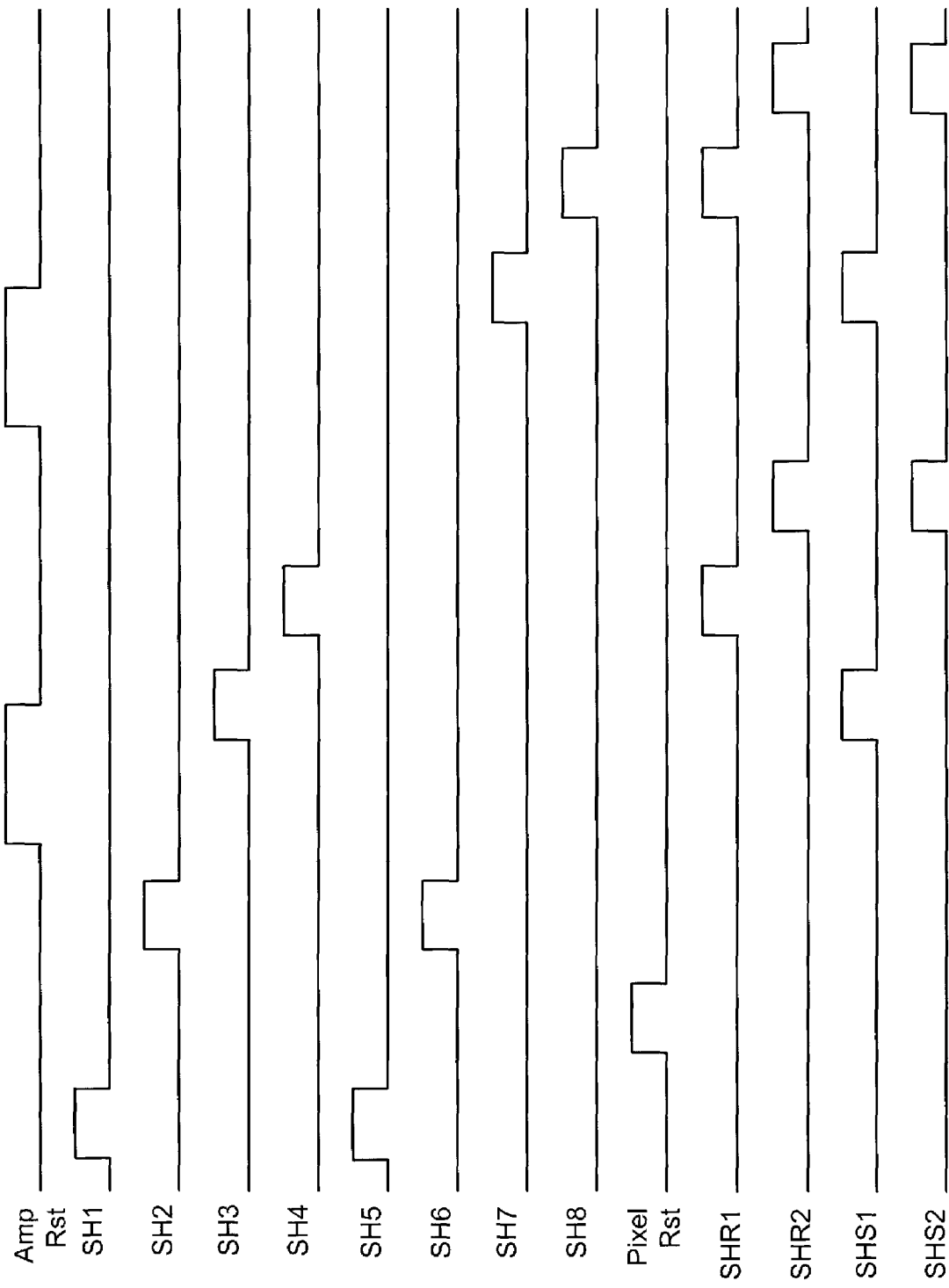
FIG. 8 is a simplified timing diagram associated with the circuitry of FIG. 7.

FIG. 7 more clearly illustrates the construction of readout circuit 652 of FIG. 6. The column readout circuit 652 includes sample and hold read out circuits 701, 703 with a shared amplifier 434 for two columns, shown as column lines 702, 704. The FIG. 7 circuit is capable of simultaneously sampling and holding and then amplifying the Vrst and Vsig values for two pixels coupled to column lines, 702, 704 for subsequent use by the output stage 354. The two column lines 702, 704 may be, but need not be, from adjacent columns of pixels.

A Vsig from a first desired pixel ("Vsig1") coupled to column line 702 is stored on C1 capacitor 718 at the same time that a Vsig from a second desired pixel ("Vsig2") coupled to a second column line 704 is stored on C3 capacitor 719. Then a Vrst from the first desired pixel ("Vrst1") is stored on C2 capacitor 720 at the same time that a Vrst from the second desired pixel ("Vrst2") is stored on C4 capacitor 721. Then the Vsig1 stored on C1 capacitor 718 is transferred and amplified by amplifier 434 to capacitor 462. Then Vrst1 stored on C2 capacitor 720 is transferred and amplified by amplifier 434 to capacitor 460, at which point the Vrst and Vsig signals for the first desired pixel are readout to an output stage 354. After the signal from the first desired pixel are read out, the Vsig2 stored on C3 capacitor 719 is transferred and amplified by amplifier 434 to capacitor 462. Then Vrst2 stored on C4 capacitor 721 is transferred and amplified by amplifier 434 to capacitor 460, at which point the Vrst and Vsig signals for the second desired pixel are readout to an output stage 354.

As seen in FIG. 7, a first column line 702 is switchably coupled through SH1 switch 710 to the front side of C1 capacitor 718. The backside of C1 capacitor 718 is coupled to ground. The front side of C1 capacitor 718 is also switchably coupled through SH3 switch 714 through a buffer 430 to the front side of capacitor 438. The first column line 702 is also switchably coupled through SH2 switch 712 to the front side of C2 capacitor 720. The backside of C2 capacitor 720 is coupled to ground. The front side of C2 capacitor 720 is also switchably coupled through SH4 switch 716 through a buffer 430 to the front side of capacitor 438.

A second column line 704 is switchably coupled through SH5 switch 711 to the front side of C3 capacitor 719. The backside of C3 capacitor 719 is coupled to ground. The front side of C3 capacitor 719 is also switchably coupled through SH7 switch 715 through a buffer 430 to the front side of capacitor 438. The second column line 704 is also switchably coupled through SH6 switch 713 to the front side of C4 capacitor 721. The backside of C4 capacitor 721 is coupled to ground. The front side of C4 capacitor 721 is also switchably coupled through SH8 switch 717 through a buffer 430 to the front side of capacitor 438.

The backside of capacitor 438 is coupled to a first input line to an amplifier 434. Vref is coupled to the second input line to amplifier 434. The first input line to the amplifier 434 is switchably coupled through Amp Rst switch 436 to the output of amplifier 434. The first input line to the amplifier 434 is also coupled through Amp Rst switch 436 to the output of amplifier 434. The output of amplifier 434 is switchably coupled through SHR1 switch 472 to a frontside of capacitor 460. The backside of capacitor 460 is coupled to ground. The frontside of capacitor 460 is switchably coupled through SHR2 switch 476 to a first input to output stage 354. The output of amplifier 434 is also switchably coupled through SHS1 switch 474 to a frontside of capacitor 462. The backside of capacitor 462 is coupled to ground. The frontside of capacitor 462 is switchably coupled through SHR2 switch 478 to a second input to output stage 354.

The operation of the FIG. 7 circuit is now described with reference to the simplified signal timing diagram of FIG. 8 (assuming a readout from a 3T pixel). To store Vsig1 on C1 capacitor 718 and at the same time store Vsig2 on C3 capacitor 719 while the pixels are in the signal sampling phase, pulse signals SH1, SH5 are applied which temporarily closes the SH1, SH5 switch 710, 711 which respectively couples the first desired pixel with the front side of C1 capacitor 718 through the column line 702 and the second desired pixel with the front side of C3 capacitor 719 through the column line 704. Thus, Vsig1 is stored on C1 capacitor 718 and Vsig2 is stored on C3 capacitor 719. After the desired pixels are pulsed by a pixel reset signal, the pixels are in reset signal sampling phase. To store Vrst1 on C2 capacitor 720 a pulse signal SH2 is applied which temporarily closes the SH2 switch 712 and couples the first desired pixel with the front side of C2 capacitor 720 through the column line 702. To store Vrst2 on C4 capacitor 721 at the same time that Vrst1 is stored, a pulse signal SH6 is applied which temporarily closes the SH6 switch 713 and couples the second desired pixel with the front side of C4 capacitor 721 through the column line 704. Thus, Vrst1 is stored on C2 capacitor 720 and Vrst2 is stored on C4 capacitor 721.

To transfer Vsig1 through the amplifier 434, pulse signals Amp Rst, SH3, and SHS1 are applied which temporarily closes SH3, Amp Rst, and SHS1 switches 436, 714, and 474 and forces the signal stored on the front side of C1 capacitor 718 and carried on line 702 through amplifier 434 after going through a buffer 430 and a capacitor 438. The signal output from amplifier 434 is stored on capacitor 462. Thus, the amplified Vsig1 signal is stored on capacitor 462. To transfer Vrst1 through the amplifier 434, pulse signals SH4 and SHR1 are applied which temporarily closes SH4 and SHR1 switches 716 and 472 and forces the signal stored on the front side of C2 capacitor 720 and carried on line 702 through amplifier 434 after going through a buffer 430 and a capacitor 438. The signal output from amplifier 434 is stored on capacitor 460. Thus, the amplified Vrst1 signal is stored on capacitor 460. Vsig1 and Vrst1 signals are transferred to output stage 354 by applying pulses SHR2, SHS2 enabling and closing respective SHR2, SHS2 switches 476, 478.

To transfer Vsig2 through the amplifier 434, pulse signals Amp Rst, SH7, and SHS1 are applied which temporarily closes SH7, Amp Rst, and SHS1 switches 436, 715, and 474 and forces the signal stored on the front side of C3 capacitor 719 and carried on line 704 through amplifier 434 after going through a buffer 430 and a capacitor 438. The signal output from amplifier 434 is stored on capacitor 462. Thus, the amplified Vsig2 signal is stored on capacitor 462. To transfer Vrst2 through the amplifier 434, pulse signals SH8 and SHR1 are applied which temporarily closes SH8 and SHR1 switches 717 and 472 and forces the signal stored on the front side of C4 capacitor 721 and carried on line 704 through amplifier 434 after going through a buffer 430 and a capacitor 438. The signal output from amplifier 434 is stored on capacitor 460. Thus, the amplified Vrst2 signal is stored on capacitor 460. Vsig2 and Vrst2 signals are transferred to output stage 354 by applying pulses SHR2, SHS2 enabling and closing respective SHR2, SHS2 switches 476, 478.

Therefore, column readout circuit 652 uses a shared column amplifier and reads out Vrst and Vsig signals values from two pixels and delivers them to downstream circuit 354.

Figure 9:
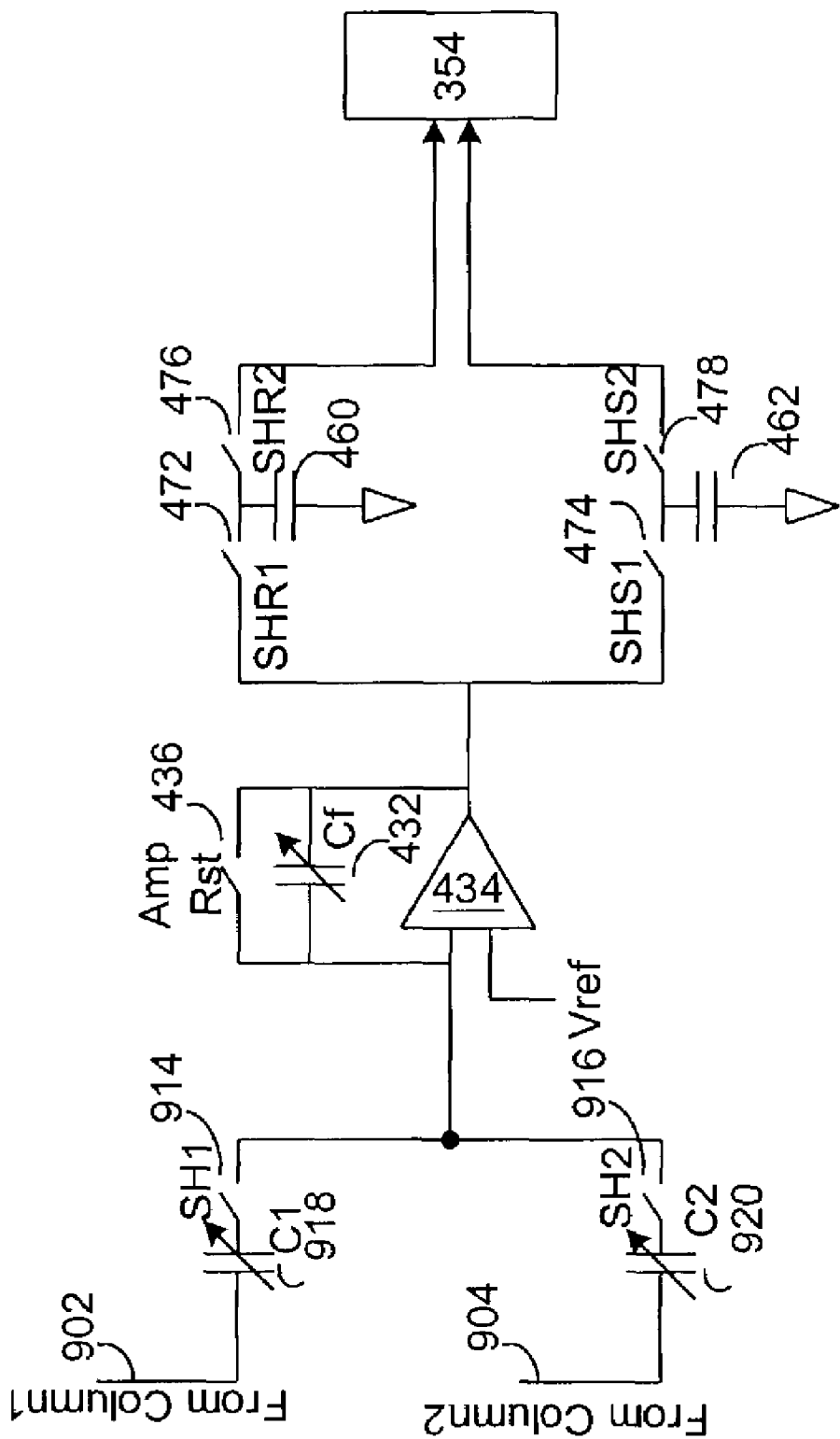
FIG. 9 is a two column shared amplifier readout circuitry in accordance with another exemplary embodiment of the invention.

FIG. 9 illustrates a shared column amplifier 652 (FIG. 6) in accordance with another embodiment of the present invention. This embodiment has an initial storage area, capacitors 918, 920, which is capable of receiving and storing two simultaneously received signals from column lines 902, 904, a shared amplifier 434, and a secondary storage area, capacitors 460, 462, for storing the amplified sample and the reset signals. Since Vrst of the first pixel and Vrst of the second desired pixel are substantially equivalent, Vrst of the first desired pixel coupled to column line 902 can be used for the Vrst of the second desired pixel coupled to column line 904 and visa versa.

As seen in FIG. 9, first column line 902 is coupled to the front side of C1 capacitor 918. The backside of C1 capacitor 918 is switchably coupled through SH1 switch 914 to a first input line of an amplifier 434. Vref is coupled to the second input line to amplifier 434. A second column line 904 is coupled to the front side of C2 capacitor 920. The backside of C2 capacitor 920 is switchably coupled through SH2 switch 916 to a first input line of an amplifier 434.

The first input line to the amplifier 434 is switchably coupled through Amp Rst switch 436 to the output of amplifier 434. The output of amplifier 434 is switchably coupled through SHR1 switch 472 to a frontside of capacitor 460. The backside of capacitor 460 is coupled to ground. The frontside of capacitor 460 is switchably coupled through SHR2 switch 476 to a first input to output stage 354. The output of amplifier 434 is also switchably coupled through SHS1 switch 474 to a frontside of capacitor 462. The backside of capacitor 462 is coupled to ground. The frontside of capacitor 462 is switchably coupled through SHR2 switch 478 to a second input to output stage 354.

Figure 10:
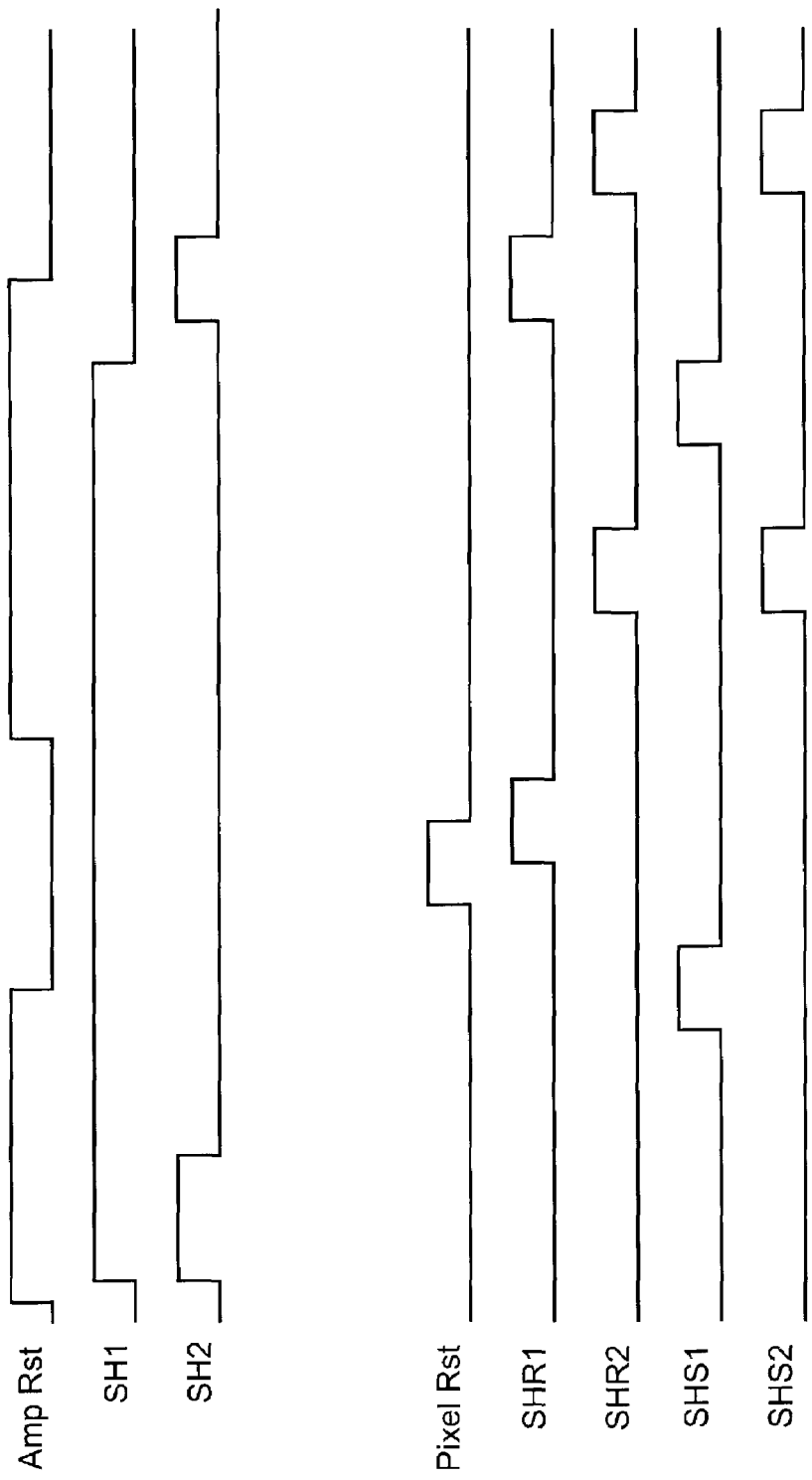
FIG. 10 is a simplified timing diagram associated with the circuitry of FIG. 9.

The operation of the FIG. 9 circuit is now described with reference to the simplified signal timing diagram of FIG. 10 (assuming a readout from a 3T pixel). The C1, C2 capacitors 918, 920 and the amplifier 434 are precharged by applying Amp Rst, SH1, and SH2 pulses, which temporarily closes Amp Rst, SH1, and SH2 switch 436, 914, 916.

To simultaneously store Vsig1 on C1 capacitor 918 and Vsig2 on C2 capacitor 920 while the pixels are in the signal sampling phase, the first desired pixel is coupled with the front side of capacitor 918 through the column line 902 and the second desired pixel is coupled with the front side of capacitor 920 through the column line 904. Thus, Vsig1 is stored on C1 capacitor 918 and Vsig2 is stored on C2 capacitor 920. The Vsig1 signal stored on C1 capacitor 918 is carried through to the secondary storage area by applying pulse signals SH1, SHS1 which temporarily closes the SH1 switch 914 and the SHS1 switch 474, and couples capacitor 462 with C1 capacitor 918 through amplifier 434. Thus the Vsig1 is stored on capacitor 462.

After the first and second desired pixels are pulsed by a pixel reset signal, the pixels are in reset signal sampling phase. C1 capacitor 918 couples with the first desired pixel through the first column line 902 thereby storing Vrst1 on C1 capacitor 918. The Vrst1 signal stored on C1 capacitor 918 is carried through to the secondary storage area by applying pulse signals SH1, SHR1 which temporarily closes the SH1 switch 914 and the SHR1 switch 472, and couples capacitor 460 with C1 capacitor 918 through amplifier 434. Thus the Vrst1 is stored on capacitor 460. Vrst1 and Vsig1 signals are transferred to output stage 354 by applying pulses SHR2, SHS2 enabling and closing respective SHR2, SHS2 switches 476, 478.

After the Vrst1 and Vsig1 signals of the first desired pixel are amplified and transferred to the output stage 354, the Vrst1 signal of the first desired pixel and Vsig2 signal of the second desired pixel are amplified and transferred to the output stage 354.

The C1 capacitor 918 and the amplifier 434 are precharged by applying Amp Rst, SH1 pulses which temporarily closes Amp Rst, SH1 switch 436, 914. C1 capacitor 918 couples with the first desired pixel through the first column line 902 thereby storing Vrst1 on C1 capacitor 918. The Vrst1 signal stored on C1 capacitor 918 is carried through to the secondary storage area by applying pulse signals SH1, SHS1 which temporarily closes the SH1 switch 914 and the SHS1 switch 474, and couples capacitor 462 with C1 capacitor 918 through amplifier 434. Thus the Vrst1 is stored on capacitor 462. The Vsig2 signal stored on C2 capacitor 920 is carried through to the secondary storage area by applying pulse signals SH2, SHR1 which temporarily closes the SH2 switch 916 and the SHR1 switch 472, and couples capacitor 460 with C2 capacitor 920 through amplifier 434. Thus the Vsig2 is stored on capacitor 460. Vrst1 and Vsig2 signals are transferred to output stage 354 by applying pulses SHR2, SHS2 enabling and closing respective SHR2, SHS2 switches 476, 478. Thus, the Vrst1 of the first desired pixel and the Vsig2 of the second desired pixel are amplified and transferred to the output stage 354. Although described in terms of reading out Vrst1 twice, once with Vsig1 and once with Vsig2, the invention is not so limited and may transfer Vsig2 from C2 capacitor 920 and store in capacitor 460, and then sample Vrst2 which is amplified and stored in capacitor 462.

Although shown as variable capacitors, capacitors 418, 420 may be fixed capacitors. The variable capacitors allow different gains to be applied to the signals stored in the C1, C3 capacitors 418, 420 for use in different situations.

Thus, a column circuit readout with a shared amplifier between columns is provided that reduces column to column noise, signal loss and die area.

Figure 11:
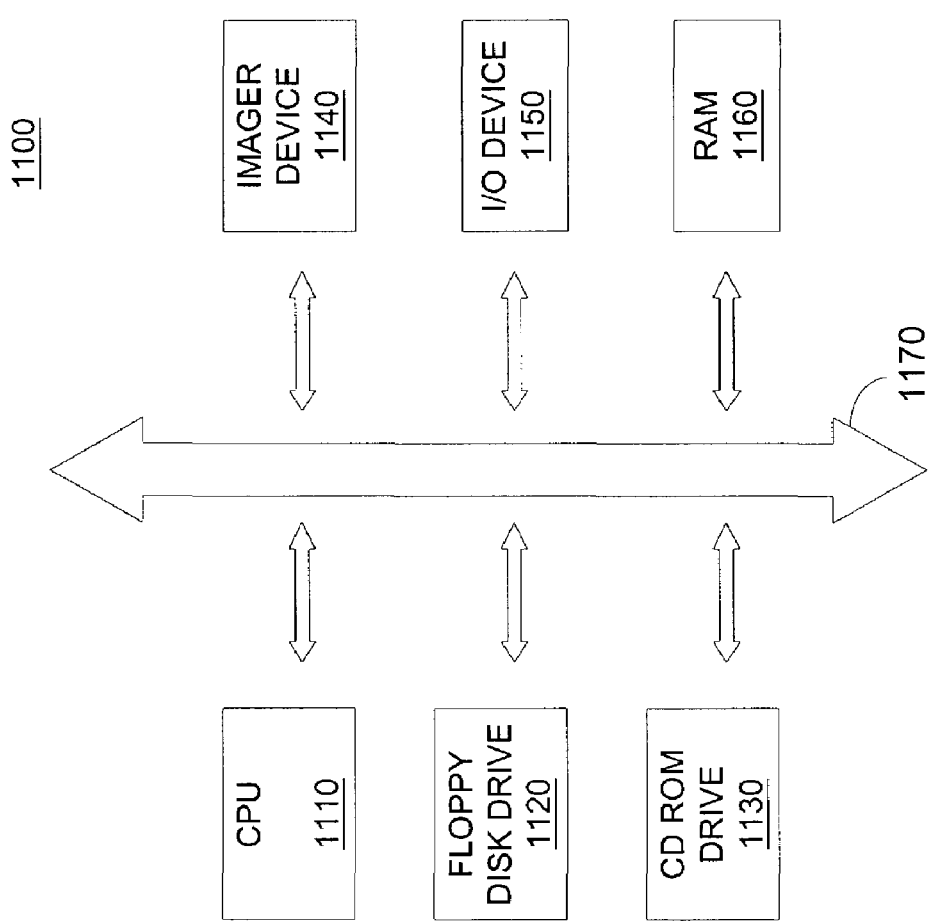
FIG. 11 is a block diagram representation of a processor-based system incorporating a CMOS imaging device in accordance with an exemplary embodiment of the invention.

The method and apparatus aspects of the invention are embodied in an image device 1140 shown in FIG. 11 which provides an image output signal. The image output signal can also be used in a processor system 1100, also illustrated in FIG. 11. A processor based system, such as a computer system, for example, generally comprises a central processing unit (CPU) 1110, for example, a microprocessor, that communicates with one or more input/output (I/O) devices 1150 over one or more buses 1170. The CPU 1110 also exchanges data with random access memory (RAM) 1160 over the one or more buses 1170, typically through a memory controller. The processor system may also include peripheral devices such as a floppy disk drive 1120 and a compact disk (CD) ROM drive 1130 which also communicate with CPU 1110 over one or more buses 1170.

While the invention has been described and illustrated with reference to specific exemplary embodiments, it should be understood that many modifications and substitutions can be made without departing from the spirit and scope of the invention. Although the embodiments discussed above describe specific numbers of transistors, photodiodes, conductive lines, or pixel type (e.g., 3T, 4T), etc. the present invention is not so limited. Furthermore, many of the above embodiments described are shown with respect to the operation of the shared amplifier between two adjacent columns, the spirit of the invention is not so limited. Accordingly, the invention is not to be considered as limited by the foregoing description but is only limited by the scope of the claims.

What is claimed as new and desired to be protected by Letters Patent of the United States is:

1. A method of operating a shared column amplifier in an imaging pixel array, said method comprising:
   sampling and holding a first charge accumulated signal from a first desired pixel in a first pixel array column;

sampling and holding a second charge accumulated signal from a second desired pixel in a second pixel array column;

sampling and holding at least one of a first and second respective reset signal from said first and second desired pixels;

sequentially amplifying through one amplifier circuit path said first sampled and held charge accumulated signal and then one of said sampled and held first and second reset signals;

providing, substantially simultaneously, said amplified signals of said first sampled and held charge accumulated signal and said one of said sampled and held first and second reset signals to a downstream circuit;

sequentially amplifying through said one amplifier circuit path said second sampled and held charge accumulated signal and then said one of said sampled and held first and second reset signals; and providing, substantially simultaneously, said amplified signals of said second sampled and held charge accumulated signal and said one of said sampled and held first and second reset signals to a downstream circuit.

2. The method of claim 1, wherein said sampling and holding of said first and second charge accumulated signals is substantially simultaneous.

3. The method of claim 1, further comprising:
storing said amplified first and second charge accumulated signals.

4. The method of claim 1, further comprising:
storing said amplified at least one of said first and second reset signals.

5. The method of claim 4, wherein first and second reset signals are sampled and held and amplified by said amplifier, said method further comprising storing said amplified first and second reset signals.

6. The method of claim 1 further comprising:
buffering through a buffer said sampled and held first and second charge accumulated signals and said sampled and held at least one of said first and second reset signals.

7. The method of claim 1, wherein first and second reset signals are sampled and held and both said first and second reset signals are amplified by said one amplifier.

8. The method of claim 7, wherein said sampling and holding of said first and second reset signals is substantially simultaneous.

9. The method of claim 1, further comprising the step of:
sequentially storing, after said step of first sequentially amplifying and before said step of providing said amplified signals, said first sampled and held charge accumulated signal and said one of said sampled and held first and second reset signals in respective storage areas.

10. The method of claim 9, further comprising the step of:
sequentially storing, after said step of second sequentially amplifying and before said step of providing said amplified signals, said second sampled and held charge accumulated signal and said one of said sampled and held first and second reset signals in respective storage areas.

11. A shared column amplifier circuit for an imager, comprising:
a first circuit for sampling and holding an image signal from a first desired pixel in a first column of a pixel array;
a second circuit for sampling and holding an image signal from a second desired pixel in a second column of a pixel array;
at least one of said first and second circuits for further sampling and holding at least one reset signal from one of said first desired pixel and said second desired pixel; and
an amplifier circuit path for sequentially amplifying said sampled and held image signal from said first desired pixel and one of said at least one sampled and held reset signal and for sequentially amplifying said sampled and held image signal from said second desired pixel and said one of said at least one sampled and held reset signal.

12. The circuit of claim 11, wherein said amplifier circuit path is respectively switchably coupled to said first and second circuits.

13. The circuit of claim 11, wherein said first circuit further comprises:
a first storage circuit for said holding of said sampled image signal from said first desired pixel and a sampled associated reset signal.

14. The circuit of claim 13, wherein said second circuit further comprises:
a second storage circuit for said holding of said sampled image signal from said second desired pixel.

15. The circuit of claim 14, wherein said second storage circuit further comprises a first and a second storage areas.

16. The circuit of claim 15, wherein said first and second storage areas are capacitors.

17. The circuit of claim 14, wherein said second storage circuit is switchably coupled to said second desired pixel.

18. The circuit of claim 13, wherein said first storage circuit further comprises a first and second storage areas.

19. The circuit of claim 18, wherein said first and second storage areas are capacitors.

20. The circuit of claim 13, wherein said first storage circuit is switchably coupled to said first desired pixel.

21. The circuit of claim 13, wherein said second circuit further comprises:
a second storage circuit for said holding of said sampled image signal from said second desired pixel and a sampled associated reset signal.

22. The circuit of claim 11, further comprising:
a third storage circuit for storing said amplified signals.

23. The circuit of claim 22, wherein said third storage circuit is switchably coupled to a downstream circuit.

24. The circuit of claim 23, wherein said third storage circuit further comprises a first and second storage area, said first and second storage areas being respectively switchably coupled to said amplifier, said first and second storage areas being respectively switchably coupled to said downstream circuit.

25. The circuit of claim 24, wherein said first and second storage areas are capacitors.

26. The circuit of claim 11, further comprising:
a buffer for buffering said image and reset signals, said buffer respectively switchably coupled to said first and said second circuits, said buffer coupled to said amplifier.

27. A CMOS imager, comprising:
a CMOS pixel array including a first and second desired pixel; and
a shared column amplifier circuit, comprising:
first circuit for sampling and holding an image signal from said first desired pixel in a first column of said pixel array;
a second circuit for sampling and holding an image signal from said second desired pixel in a second column of said pixel array;

at least one of said first and second circuits further sampling and holding an associated reset signal from one of said first pixel and said second pixel;

an amplifier circuit path for sequentially amplifying said sampled and held image signal from said first desired pixel and one of said at least one associated reset signal and for sequentially amplifying said sampled and held image signal from said second desired pixel and said one of said at least one associated sampled and held reset signal.

28. The imager of claim 27, wherein said amplifier circuit path is respectively switchably coupled to said first and second circuits.

29. The imager of claim 27, wherein said first circuit further comprises:
a first storage circuit for said holding of said sampled image signal from said first desired pixel and said sampled associated reset signal.

30. The imager of claim 29, wherein said second circuit further comprises:
a second storage circuit for said holding of said sampled image signal from said second desired pixel.

31. The imager of claim 30, wherein said second storage circuit further comprises a first and a second storage areas.

32. The imager of claim 31, wherein said first and second storage areas are capacitors.

33. The imager of claim 30, wherein said second storage circuit is switchably coupled to said second desired pixel.

34. The imager of claim 29, wherein said first storage circuit further comprises a first and a second storage areas.

35. The imager of claim 34, wherein said first and second storage areas are capacitors.

36. The imager of claim 29, wherein said first storage circuit is switchably coupled to said first desired pixel.

37. The imager of claim 29, wherein said second circuit further comprises:
a second storage circuit for said holding of said sampled image signal from said second desired pixel and a sampled associated reset signal.

38. The imager of claim 27, further comprising:
a third storage circuit for storing said amplified signals.

39. The imager of claim 38, wherein said third storage circuit is switchably coupled to a downstream circuit.

40. The imager of claim 39, wherein said third storage circuit further comprises a first and second storage area, said first and second storage areas being respectively switchably coupled to said amplifier, said first and second storage areas being respectively switchably coupled to said downstream circuit.

41. The imager of claim 40, wherein said first and second storage areas are capacitors.

42. The imager of claim 27, further comprising:
a buffer for buffering said image and reset signals, said buffer respectively switchably coupled to said first and said second circuits, said buffer coupled to said amplifier.

43. A CMOS imager, comprising:
a CMOS pixel array including a first and second desired pixel; and
a shared column amplifier circuit, comprising:
a first circuit for sampling and holding an image signal from said first desired pixel in a first column of said pixel array;
a second circuit for sampling and holding an image signal from said second desired pixel in a second column of said pixel array;
at least one of said first and second circuits further sampling and holding an associated reset signal;
an amplifier circuit path for sequentially amplifying said image signals and said sampled and held reset signal; and
a third circuit for storing said amplified signals as first and second signal pairs in storage areas, said first signal pair including an amplified image signal from said first desired pixel and an amplified reset signal, and said second signal pair including an amplified image signal from said second desired pixel and said amplified reset signal.

44. The imager of claim 43, wherein said amplifier circuit path is respectively switchably coupled to said first and second circuits.

45. The imager of claim 43, wherein said first circuit further comprises:
a first storage circuit for said holding of said sampled image signal from said first desired pixel and said sampled associated reset signal.

46. The imager of claim 45, wherein said first storage circuit further comprises a first and a second storage areas.

47. The imager of claim 46, wherein said first and second storage areas are capacitors.

48. The imager of claim 45, wherein said first storage circuit is switchably coupled to said first desired pixel.

49. The imager of claim 43, wherein said second circuit further comprises:
a second storage circuit for said holding of said sampled image signal from said second desired pixel.

50. The imager of claim 49, wherein said second storage circuit further comprises a first and second storage areas.

51. The imager of claim 50, wherein said first and second storage areas are capacitors.

52. The imager of claim 49, wherein said second storage circuit is switchably coupled to said second desired pixel.

53. The imager of claim 43, wherein said third storage circuit is switchably coupled to a downstream circuit.

54. The imager of claim 43, wherein said storage areas of said third storage circuit comprises a first and second storage area, said first and second storage areas being respectively switchably coupled to said amplifier, said first and second storage areas being respectively switchably coupled to said downstream circuit.

55. The imager of claim 54, wherein said first and second storage areas are capacitors.

56. The imager of claim 43, further comprising:
a buffer for buffering said image and reset signals, said buffer respectively switchably coupled to said first and said second circuits, said buffer coupled to said amplifier.

57. The imager of claim 43, wherein said third circuit stores the same reset signal in each signal pair.

58. The imager of claim 43, wherein said third circuit stores different reset signals in each signal pair.

59. A method of operating a shared column amplifier in an imaging pixel array, said method comprising:
sampling and holding a first image signal from a first desired pixel in a first pixel array column;
sampling and holding a second image signal from a second desired pixel in a second pixel array column,
sampling and holding at least one of a first and second respective reset signal from said first and second desired pixels;
sequentially amplifying through one amplifier circuit path said first and second image signals and said at least one of said first and second reset signal;

storing said amplified signals as first and second signal pairs in respective first and second storage areas; said first signal pair including an amplified first image signal from said first desired pixel and an amplified reset signal, and said second signal pair including an amplified second image signal from said second desired pixel and said amplified reset signal; and providing said stored amplified signal pairs to a downstream circuit.

60. The method of claim 59, wherein said sampling and holding of at least one of a first and second respective reset signal comprises sampling and holding one reset signal from one of said first and second desired pixels; said amplifying step comprises amplifying said one reset signal; and said storing step comprises storing as said first signal pair an amplified first image signal from said first desired pixel and said amplified one reset signal and storing as said second signal pair an amplified second image signal from said second desired pixel and said amplified one reset signal.

61. The method of claim 59, wherein said sampling and holding of at least one of a first and second respective reset signal comprises sampling and holding a reset signal associated with each of said first and second desired pixels; said amplifying step comprises amplifying said sampled and held reset signals associated with each of said first and second desired pixels; and said storing step comprises storing as said first signal pair an amplified first image signal from said first desired pixel and said amplified reset signal from said first desired pixel and storing as said second signal pair an amplified second image signal from said second desired pixel and said amplified reset signal from said second desired pixel.

62. A method of operating a shared column amplifier in an imaging pixel array, said method comprising:
sampling and holding a first charge accumulated signal from a first desired pixel in a first pixel array column;
sampling and holding a second charge accumulated signal from a second desired pixel in a second pixel array column;
sampling and holding a first reset signal from one of said first desired pixel and second desired pixel;
amplifying through a first amplifier circuit path said first sampled and held charge accumulated signal;
amplifying through said first amplifier circuit path said first sampled and held reset signal;
amplifying through said first amplifier circuit path said second sampled and held charge accumulated signal;
amplifying through said first amplifier circuit path said first sampled and held reset signal;
providing said amplified first and second sampled and held charge accumulated signals to a downstream circuit;
sampling and holding a third charge accumulated signal from a third desired pixel in a third pixel array column;
sampling and holding a fourth charge accumulated signal from a fourth desired pixel in a fourth pixel array column;
amplifying through a second amplifier circuit path said third sampled and held charge accumulated signal;
amplifying through said second amplifier circuit path said fourth sampled and held charge accumulated signal; and
providing said amplified third and fourth sampled and held charge accumulated signals to said downstream circuit.

63. The method of claim 62, further comprising:
sampling and holding a second reset signal from said third desired pixel in said third pixel array column;
amplifying through said second amplifier circuit path said second sampled and held reset signal after said step of amplifying through a second amplifier circuit path said third sampled and held charge accumulated signal; and
amplifying through said second amplifier circuit path said second sampled and held reset signal after said step of amplifying through said second amplifier circuit path said fourth sampled and held charge accumulated signal.

64. An imager, comprising:
a pixel array including a first plurality of columns of pixels;
a first shared column amplifier circuit for receiving signals from a first subset of columns of said first plurality of columns, said first shared column amplifier circuit comprising:
a first image signal circuit for sampling and holding an image signal from a first desired pixel in a first column of said first subset of columns of said pixel array;
a second image signal circuit for sampling and holding an image signal from a second desired pixel in a second column of said first subset of columns of said pixel array;
a first reset signal circuit for sampling and holding a reset signal from one of said first desired and second desired pixels, said first shared column amplifier configured to sequentially amplify said first image signal and said first reset signal, said first shared column amplifier configured to sequentially amplify said second image signal and said first reset signal;
a second shared column amplifier circuit for receiving signals from a second subset of said first plurality of columns, said first subset of columns being mutually exclusive from second subset of columns, said second shared column amplifier circuit comprising:
a third image signal circuit for sampling and holding an image signal from a third desired pixel in a first column of said second subset of columns of said pixel array; and
a fourth image signal circuit for sampling and holding an image signal from a fourth desired pixel in a second column of said second subset of columns of said pixel array.

65. The imager of claim 64, wherein said second shared column amplifier circuit further comprises:
a third reset signal circuit for sampling and holding a reset signal from said first desired pixel in said second subset of columns of said pixel array; and
a fourth reset signal circuit for sampling and holding a reset signal from said second desired pixel in said second column of said second subset of columns of said pixel array.

* * * * *